United States Patent [19]
Chao

[11] Patent Number: 5,864,639
[45] Date of Patent: *Jan. 26, 1999

[54] METHOD AND APPARATUS OF RENDERING A VIDEO IMAGE

[75] Inventor: Philip C. J. Chao, Naperville, Ill.

[73] Assignee: Digital Processing Systems, Inc., Florence, Ky.

[*] Notice: This patent issued on a continued prosecution application filed under 37 CFR 1.53(d), and is subject to the twenty year patent term provisions of 35 U.S.C. 154(a)(2).

[21] Appl. No.: 410,806

[22] Filed: Mar. 27, 1995

[51] Int. Cl.$^6$ .................................................. G06K 9/32
[52] U.S. Cl. ...................... 382/293; 348/580; 348/590; 345/441; 345/474
[58] Field of Search .................................. 382/276, 293, 382/295; 348/578, 580, 584, 590; 395/125, 129, 152, 155; 345/125, 126, 135, 173, 474, 441

[56] References Cited

U.S. PATENT DOCUMENTS

| | | | |
|---|---|---|---|
| 4,831,445 | 5/1989 | Kawabe | 358/160 |
| 5,046,165 | 9/1991 | Pearman et al. | 348/590 |
| 5,053,762 | 10/1991 | Sarra | 340/734 |
| 5,214,511 | 5/1993 | Tanaka | 348/580 |
| 5,233,332 | 8/1993 | Watanabe et al. | 340/724 |
| 5,295,199 | 3/1994 | Shino | 382/41 |

Primary Examiner—Christopher S. Kelley
Attorney, Agent, or Firm—Welsh & Katz, Ltd.

[57] ABSTRACT

A method of rendering at least part of an image from an at least one external source into a two-dimensional memory array having integer x and y pixel coordinates based upon a set of integer coordinates of an outline of the rendered image. The method includes the steps of forming a parallelogram defined by a parallel series of effect lines forming an angle e with either the x or y axis of the memory array and bounded on opposing ends of the scan lines by a scan axis, the parallelogram surrounding at least part of the two-dimensional memory array and rendering the image from the at least one external source into the memory array while moving unidirectionally along the effect lines and scan axis using the outline coordinates as transition points for selection and non-selection of the image.

46 Claims, 13 Drawing Sheets

TWO DIMENSIONAL MEMORY ARRAY REPRESENTING OUTPUT IMAGE

ORIGINAL SOURCE IMAGE

GOP [ J ]
GROUP OF PIXELS
CORRESPONDS TO
JTH EFFECT LINE
(FROM LOOKUP TABLE)

GOP START [ J ]

TWO DIMENSIONAL MEMORY ARRAY REPRESENTING OUTPUT IMAGE

INTERSECTION POINTS
JTH EFFECT LINE
OUTLINE OF NEW SHAPE
RENDERED IMAGE

STARTING CORNER
START RENDER FOR JTH EFFECT LINE
STARTING PIXEL OF JTH EFFECT LINE

ENDING CORNER

METHOD AND APPARATUS OF RENDERING A VIDEO IMAGE

FIELD OF THE INVENTION

The field of the invention relates to video special effects and more particularly to graphical methods of distorting the shape of a video image.

BACKGROUND OF THE INVENTION

Video special effects of changing from a first video image "A" to a second video image "B" are generally known. Examples that are generally known include page rolling and page turning.

In page turning, a corner of the first image is generally shown to lift and fold over, thereby exposing a second image. The corner is then moved diagonally across the first image thereby exposing larger and larger portions of the second image. As the corner of the first image lifts and is folded-over the area of the front side near the fold becomes distorted and, a backside of the lifted corner is displayed as a reversed portion of the first image, which lifted corner then continues to fold over as it moves across the first image covering larger and larger portions of the first image as the first image is completely replaced by the second image.

In page rolling, a corner (or even a whole side) of the first image is seen to lift and roll across the screen covering the first image and exposing the second image. A reversed backside of the first image is displayed as a rolling cylinder which rolls over the first image.

Alternatively, the first image will be seen to form parallel waves across the screen with the first image following the peaks and valleys of the waves. The waves of the first image may then be swept off the screen from one side to the other as the first image is replaced by the second image.

Often the parallel waves will be seen to slope from left to right or right to left forming an angle of θ with the x or y axis along an effect axis when viewed from the bottom to the top of the screen. Where the peaks of the waves of the first image appear at the bottom of the screen, portions of the second image will become visible below the wave peaks of the first image.

Similarly when page turning is used, the first image, on the page being turned, is typically made to appear distorted where the corner of the first image is lifted to turn the page. The distorted area of the first image follows the folded-over corner of the first image as the page is turned to reveal the second image.

A number of known processes are available for providing page turning video effects. One known technique requires a complicated vector analysis process to track a turned edge of the first image. A vector origin that may or may not coincide with a corner of the image is first determined. A coordinate system corresponding with the turned edge of the image is then imposed on the page turning process. The results of the vector analysis is then used to access data for forming the image within non-linear portions of the turned page.

Such techniques require a double buffer for storing video information. The first buffer stores the prior image while the second buffer stores the page turning graphics generated through vector processing. A video switch is then used to switch between the second buffer providing the graphics for the first image and the buffer providing the second image.

While prior art techniques are effective in creating the complicated graphics associated with page turning and the like, the process of generating such graphics is computationally intensive. The computational intensity and complexity of such processing also limits the flexibility of such systems.

Other examples of a page turning video graphics divide the video screen into a number of different boundary areas divided by a number (e.g., three) of parabolic boundary lines and one straight boundary line. The locations of the boundary lines are determined by solving four equations. To simplify the computational complexity, a processor first identifies intersection points of the boundary lines for each step of the page turning process and then calculates a parabolic and linear position for the boundary lines. A video switch then switches from a first to a second video image, from the first video image to a blank image (backside of the first video image), or from the blank image to the second video image based upon which boundary line is crossed.

Conventional rendering techniques, such as described above, generate page turning effects by splitting the rectangular image into several portions: a) previous image; b) distorted previous image; c) distorted reverse side of previous image; and d) next image. The boundaries between the portions may be defined by circles, lines, or parabolas.

Conventional methods and apparatus create the effect of geometrical distortions by using circular or parabolic mapping processes. However, visual observations of a person actually turning a page reveal that such circular-shaped boundaries do not provide an accurate rendition of page turning. Also, since the special effect of the geometrical distorted portion is created one horizontal scan line at a time, the creation of a high quality special effect image involving geometrical distortion is inherently computationally intensive.

Conventional methods also typically process the video signals real-time. Since real-time video signals (NTSC and PAL broadcast standards) provide one scan line at a time, the conventional method must render one horizontal scan line at a time to keep up with the real-time video source. If non-horizontal rendering is used, frequently there are gaps in the rendered portions of an image (i.e., not all pixels in the rendered area are guaranteed to be rendered).

While the known processing systems perform adequately, such systems do not make efficient use of video processing resources. Conventional rendering techniques either perform complex calculations to obtain needed high quality video images or completely avoid the complex calculations at the expense of providing a lesser quality image. Because of the importance of video processing, a need exists for a means of rendering video imaging special effects that is less computationally intensive.

SUMMARY OF THE INVENTION

Accordingly, it is an object of this invention to provide a novel method for rendering a source video image into a new shape in the special effect output image that is less computationally intensive.

It is a further object of the invention to provide a novel modified incremental line drawing routine for video systems that is capable of drawing continuous lines.

It is a further object of the invention to provide a novel method of rendering page turning effects that is less computationally intensive. The method employs two interrelated hyperbolas and a straight line to outline the new shape of the rendered image in the output image.

These and other objects are accomplished by apparatus for performing a novel method of rendering an at least part of an image from an at least one external source into a two-dimensional memory array having integer x and y pixel coordinates based upon a set of integer coordinates of an outline of a new shape within the rendered image. The method includes the steps of forming a parallelogram defined by a parallel series of effect lines forming an angle θ with either the x or y axis of the memory array and bounded on opposing ends of the scan lines by a scan axis, the parallelogram surrounding at least part of the two-dimensional memory array and rendering the image from the at least one external source into the memory array while moving unidirectionally along the effect lines and scan axis using the outline coordinates as transition points for selection and non-selection of the image.

The parallelogram surrounds the outline of the new shape of the rendered image. Each effect line is drawn using an incremental line drawing routine and intersects the outline at intersection points, the coordinates of which are used for selecting a source image and for selecting the corresponding group of pixels from the source image for determining the colors rendered along a particular effect line. Many special effects, such as page turning using two hyperbolic lines to define a page turning edge, can be rendered by a linear mapping to the pixels located between the intersection points of an effect line of a destination image from the pixels on a corresponding line intersecting the source image.

The parallelogram is bounded by a first effect line starting at a starting corner, a corresponding last effect line at an ending corner, a first scan axis defining a starting point of each effect line, and a second scan axis defining an ending point of each effect line. The modified incremental line drawing routine is used along the scan axis to determine the coordinates of the starting pixel of each effect line. The modified incremental line drawing routine is also used along the effect axis to determine, and save into a look-up table, the coordinates of the sequence of pixels on the effect axis. Every effect line is rendered based on the same look-up table using different starting pixel coordinates as an offset.

The rendered image may be rendered directly from an at least one video source or from a number of video sources. Where a number of video sources are used the outline coordinates may be used as transition points between video sources.

The intersection points for every effect line may be retrieved from a read-only memory or the intersection points for every effect line may be generated during image rendition to mark an image outline on a memory array. Where a color is marked on the array the outline markings may then be sensed by a rendering processor and used to select video sources.

The modified incremental line drawing routine is used to mark a black image with a distinct color value identifying the edges of a new shape. The marking may require moderately complex calculations depending on the shape. On the average two calculations per line are required. Alternatively, the marked image can be pre-computed and the coordinates of the outline stored in a look-up table. Where the coordinates of the image are precomputed, no complex calculations are required for rendering a transition image.

The modified incremental line drawing method is used to scan the marked image along an effect axis to identify the coordinates of marked edges of the shape that typically has two edges. The coordinates of the first intersection point and last intersection point form the edge pixel pair for the line. Scanning the entire image results in a table of pixel pairs. The scanning for pixel pairs does not require complex calculations such as multiplication or division.

During rendering, the colors of pixels between the two intersecting points (identified by the pixel pairs) are copied from a corresponding group of pixels within the original image. For page turning, the group of original pixels can be identified by an x-axis and y-axis offset from an image edge of the pair of pixel pairs of the intersecting points for the scan line. For quadrilateral distortion, the group of original pixel can be identified by the distance between the pair of the intersection points for the scan line and the distances among the four corners of the distorted quadrilateral. For page rolling, the group of original pixel can be identified by the distance of the roll from the edge.

During rendering, the pixels outside the two intersection points on the effect line are mapped to pixels outside the original image. The pixels outside the original image are part of the new image and are not modified (i.e., the new pixels are transparent pixels).

The number of pixels in the group of pixels of an image may not be equal to the number of pixels between the two intersection points of the scan line. If they are equal, such as in page turning effect using a double hyperbola outline, then the rendering process becomes that of direct copying of the colors from the original image to the new image. If they are not equal, then another incremental line drawing step may be used to map linearly between the two set of pixels (resizing the set). This step does not require complicated calculations such as multiplication or division.

DETAILED DESCRIPTION OF A PREFERRED EMBODIMENT

Figure 1:
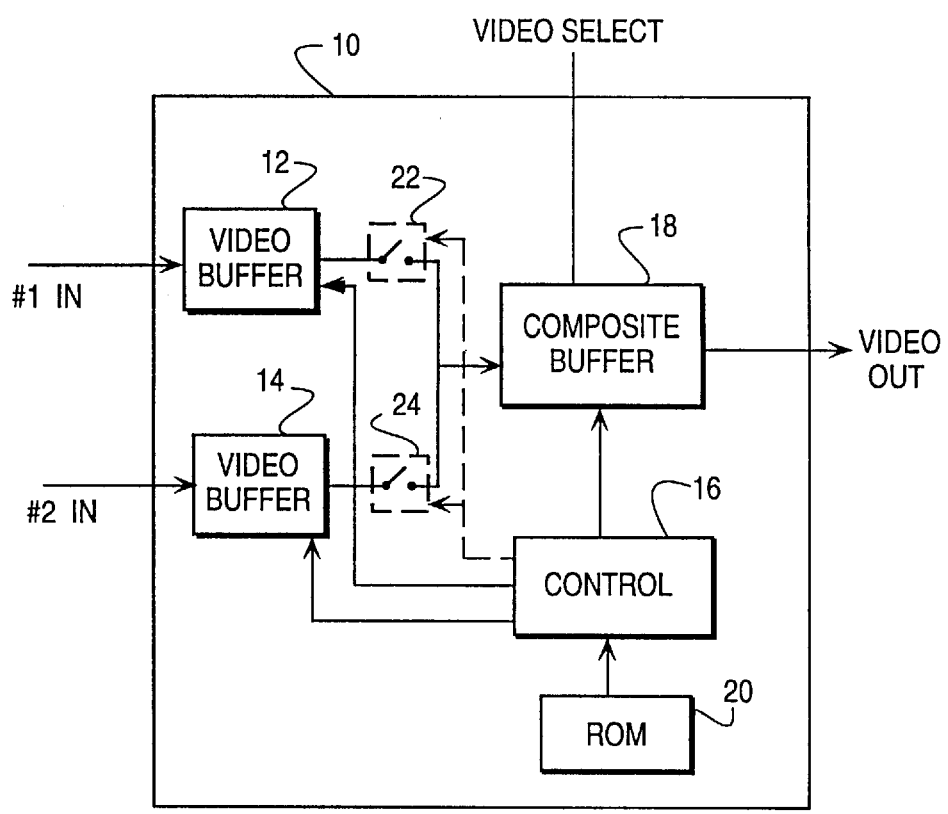
FIG. 1 is a block diagram of apparatus for rendering a video transition image from two different video sources in accordance with an embodiment of the invention.

FIG. 1 shows a block diagram of an image rendering system 10, generally, in accordance with an embodiment of the invention. Included within the image rendering system 10 are input buffers 12, 14 for buffering input images #1 and #2. While the buffers 12, 14 will generally be referred to as video buffers, it is understood that image buffering in buffers 12, 14 may occur under any digital format.

A composite buffer (COMP BUFF) 18 may be used to provide an output of the image rendering system 10, while a controller 16 provides control functions to the buffers 12, 14, 18. The output image may be rendered into the composite buffer 18 under any of a number of appropriate formats; however, the composite buffer 18 can generally be considered to be a two-dimensional array.

Software for the controller 16 and graphics rendering are retrieved from a read only memory (ROM) 20. A pair of optional switches 22, 24 under the control of the controller 16 may be used to provide signals from either the first image buffer 12 or the second image buffer 14 directly to the composite buffer 18.

Buffers 12, 14, and 18 are memory devices that under one embodiment are capable of holding a complete frame of video information. For ease of understanding the buffers 12, 14, 18 will be described in terms of a two dimensional matrix having a number of rows (e.g., 512) of storage elements (one row for each of the 512 scan lines of a television screen) with a storage element in each row for each pixel in a horizontal scan. Casting the buffers 12, 14, 18 in terms of a two-dimensional matrix allows the elements of the matrix (and pixels) to be conveniently identified using Cartesian (x,y) coordinates.

Figure 2A:
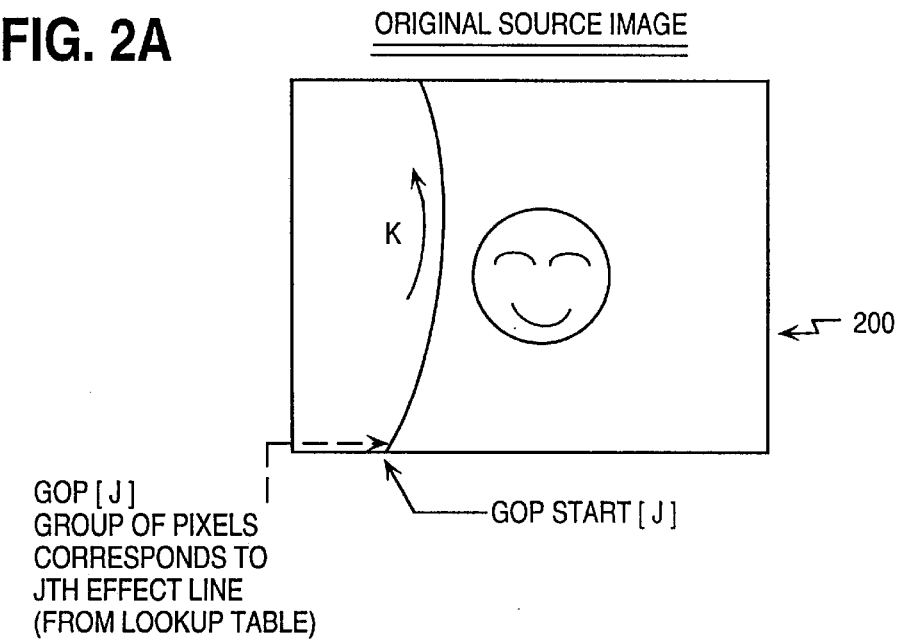
FIGS. 2a–2c depicts geometric figures used for a particular type of transition video image of FIG. 1.
Figure 2B:
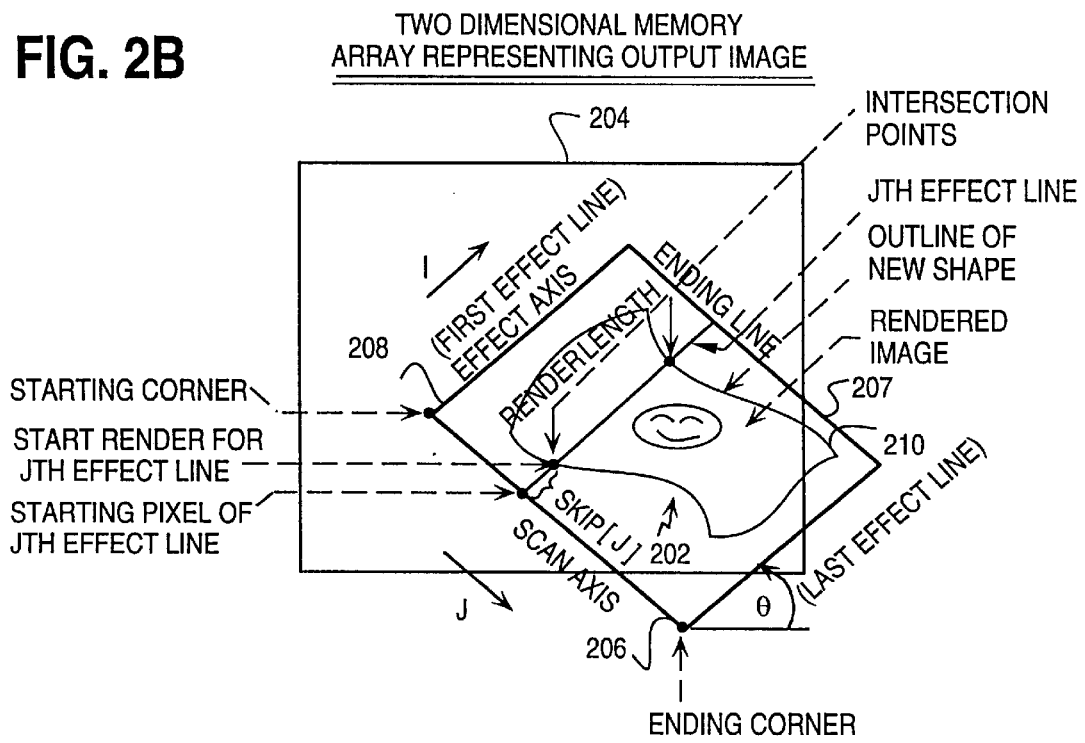

Under the embodiment, the image rendering system 10 may be used to render the source image 200 of FIG. 2a into a portion 202 of an output image formed within the two-dimensional array 204 of FIG. 2b without the use of complicated multiplication or division routines. Under the embodiment the source image 200 may be rendered against a blank background or may be rendered over another image previously written into the composite buffer 18.

Under the embodiment, the source image 200 is rendered into the output image 202 based upon a parallelogram scanning technique that is superimposed over the area into which the output image 202 is to be written. Opposing sides of the parallelogram (i.e., scan axis and effect axis) are typically non-coincident with the x and y coordinate system of the two-dimensional array of the composite buffer 18.

Under the parallelogram scanning routine, the parallelogram defined by the scan axis 206 and effect axis 208 is scanned parallel to the effect axis one line at a time from the first effect line to the last effect line. As the parallelogram is scanned, pixel values from the source image 200 are written into composite buffer pixel coordinates along each effect line as the parallelogram is unidirectionally scanned one effect line at a time along the scan axis from the first effect line 208 to the last effect line.

The scan axis 206 and effect axis 208 may be stored as a locus of points in a look-up table in ROM 20 or may be generated by an incremental line drawing routine. Where the incremental line drawing routine is used, a set of coordinates defining the four corners of the parallelogram are stored in ROM 20. The four corners are then used to draw the two scan axis 206, 207 from a starting corner to an ending corner. The result of the incremental drawing of the scan axis 206, 207 is a locus of points defining the two scan axis lines 206, 207. After drawing the two scan axis, incremental line drawing may then be used to draw each effect line using a pair of coordinate locations (coordinate pair) from the two scan axis. For the first effect line, the coordinate pair is the first coordinate point of the two locus of points defining the scan axis 206, 207 (i.e., it is the coordinates of the two points shown at opposing ends of the illustrated first effect line 208). The coordinate pair of the second scan line becomes the second coordinate in the locus of points of opposing scan axis 206, 207. The last effect line is drawn using the last coordinate pair of the locus of points of the two scan axis 206, 207 drawn in the first step of parallelogram scanning.

To use incremental line drawing, a beginning pixel ($x_1$, $y_1$) and an ending pixel ($x_2$, $y_2$) are identified which the incremental line drawing routine uses as starting and ending points in the line drawing process. (As the term "line drawing" is used herein, line drawing means the identification of a locus of coordinates (pixel coordinates or pixel points) between the starting and ending points into which pixel color values may be written.) To scan along the effect lines of FIG. 2 the starting and ending points of any effect line would be a two pixel points along the scan axis 206, 207 of FIG. 2 and which forms an angle of $\theta$ with the x axis.

Figure 6:
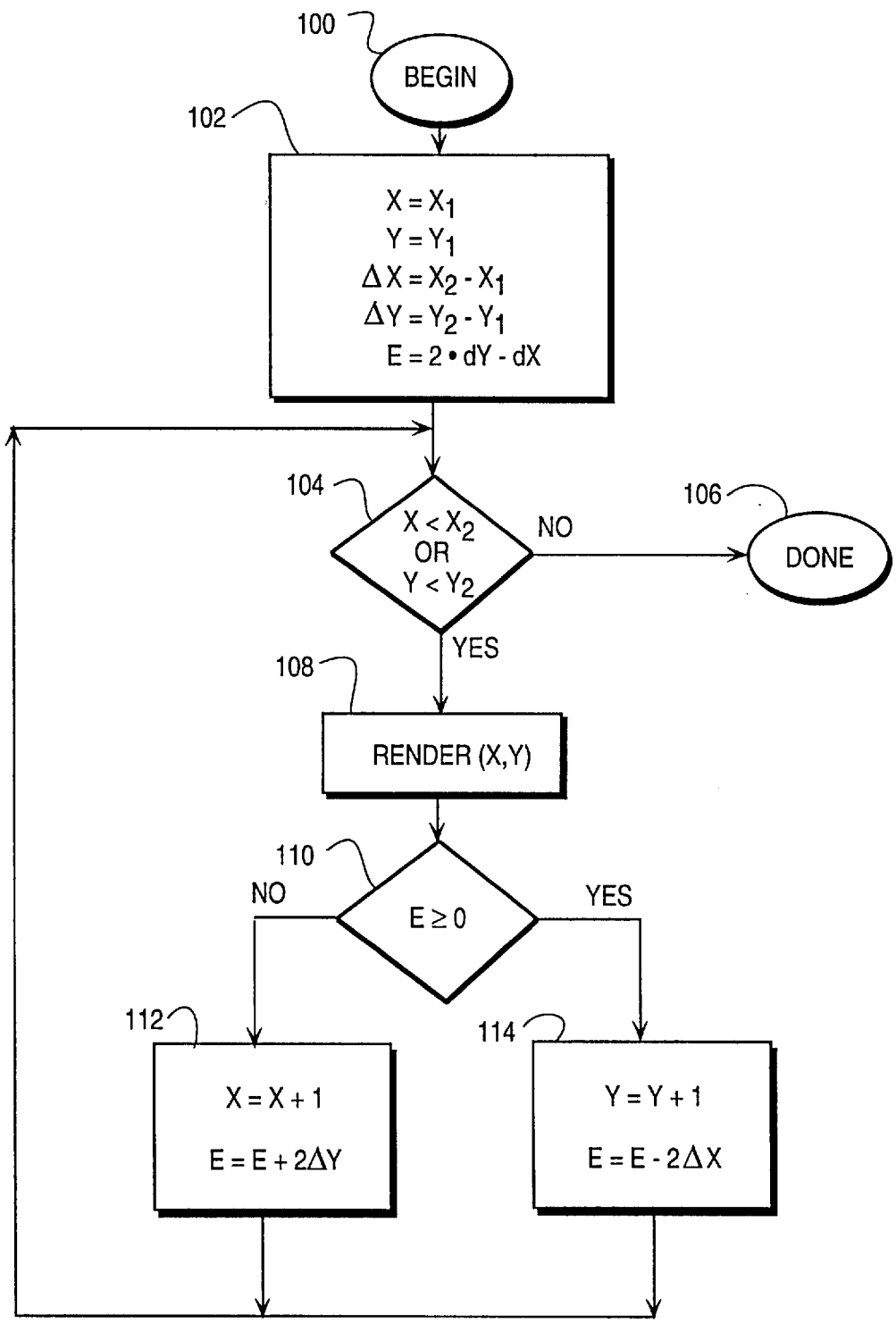
FIG. 6 is a flow chart of the incremental line drawing routine of the apparatus of FIG. 1.

FIG. 6 is a flow chart of the incremental line drawing routine in accordance with the embodiment. Under the embodiment, the controller 16 first identifies a pixel starting position ($x_1$, $y_1$) and a pixel ending position ($x_2$, $y_2$) for a particular line segment being drawn. The controller 16 initially sets 102 the drawn line coordinates x,y equal to the starting coordinates $x_1$, $y_1$. A first difference function $\Delta x$ is set equal 102 to the difference between $x_2$ and $x_1$. A second difference function $\Delta y$ is set equal 102 to the difference between $y_2$ and $y_1$. An error variable e is initialized 102 to an incremental distance dx, dy along the line equation by the equation as follows:

$$e=2dy-dx.$$

As the controller 16 enters the interactive line drawing routine, the controller first tests 104 whether the current line position x,y has reached the ending line position $x_2,y_2$. If either the x or y value of the current set of coordinates x,y is equal to, or greater than either coordinate value of the end position $x_2$, $y_2$, the controller 16 determines that line drawing is complete 106.

The controller 16 next renders the current pixel (i.e., the pixel having coordinates x,y). Rendering the pixel simply means going the appropriate video source VIDEO BUFF 12, 14 and retrieving the color value into the appropriate location x,y of the composite image 18.

After rendering a pixel, the error value e is evaluated. If the error value e is greater than or equal to zero, then the old y value ($y_1$, on the first iteration) is incremented and a new error value e is determined 114. The new error value e is based upon an old error value and two times $\Delta x$. The new error value e is now the old e value minus two $\Delta x$.

At the end of each interactive line drawing routine 104, 108, 110, either the x or the y value of the drawn line is incremented to create a new set of line coordinates x,y. (The new set of line coordinates define the next pixel location along the line being drawn.) The process is then repeated using the new line coordinates. First the controller 16 tests whether either x or y value of the new coordinates exceeds either value of the final coordinates $x_2$, $y_2$. If either value does, then the process is ended 106.

If not, the new set of coordinates x,y now become the old set of coordinates, the new error value e now becomes the old value and the process is repeated. In repeating the process, another pixel is rendered.

Again, the old error value e is evaluated 110 relative to zero. If the old error value e is again greater than or equal to zero the new y value is incremented. If the old error value e is less than zero then the new x value is incremented. A new error value e is again calculated and the process is repeated until the new coordinates x,y exceed the final coordinates $x_2$, $y_2$.

The process shown in FIG. 6 may be executed as shown for any direction in the first octant. For other directions, the sign of either x or y is changed or the relative positions of x and y is changed.

The use of incremental line drawing provides a two-dimensional mechanism for avoiding non-rendered gaps (pixels) between effect lines. The use of the incremental line drawing routine along the scan axis further avoids gaps caused by missing scan lines. Such a benefit may be optimized in a system using reverse mapping from primary video sources. Reverse mapping in such a system renders the output image into the composite buffer 18 one pixel at a time from corresponding pixels of the original image.

Figure 3:
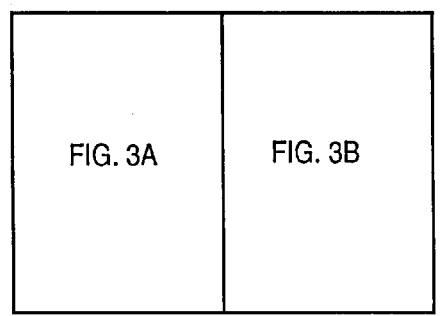
FIG. 3 depicts information flow within the controller and read only memory of FIG. 1.
Figure 3A:
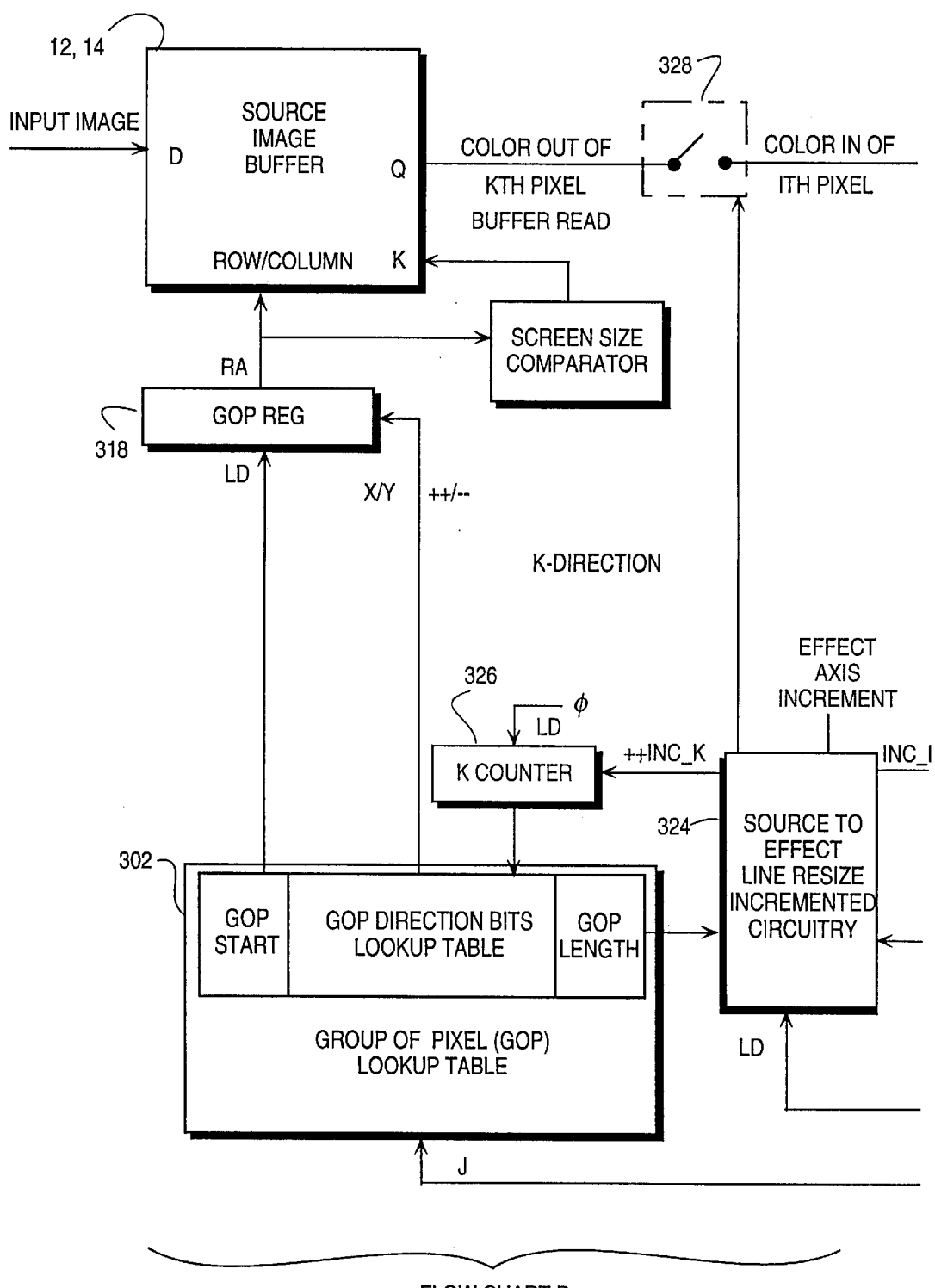
Figure 3B:
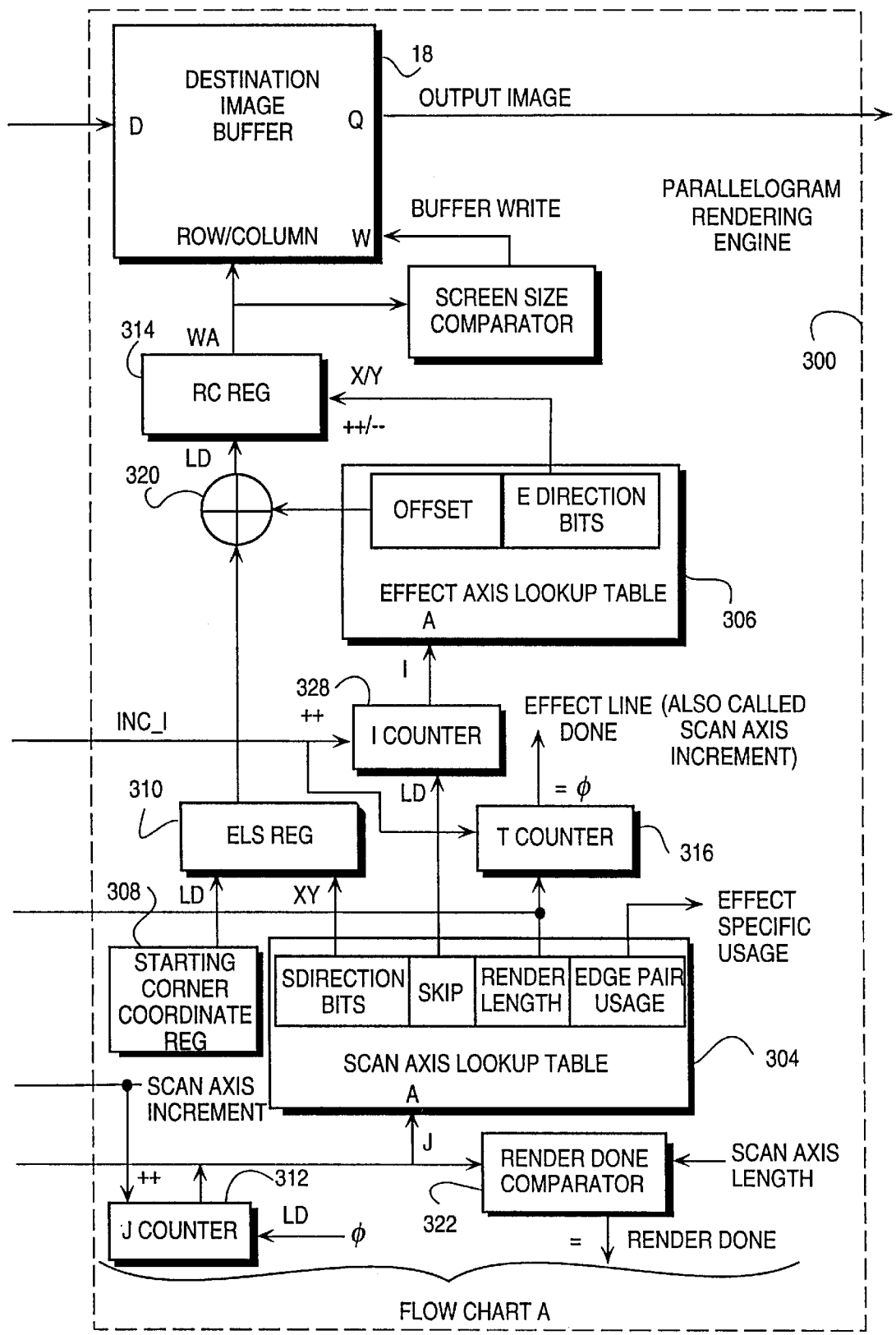

To create a desired distortions of the output image 202, an outline 210 of the output image 202 is created and used as a template within which to write (render) the pixel values of the source image 200 into the output image 202 within the composite buffer 18. The outline 210 may be stored as a locus of points in ROM 20 or may be generated based upon some algorithm.

Where the outline 210 is stored as a locus of points, the apparatus of FIG. 3 may be used in rendering the output image 202. While the source buffer shown in FIG. 3 may be either of the two buffers 12, 14 shown in FIG. 1 and the destination buffer may be the composite buffer 18, the remainder of the process apparatus of FIG. 3 may be consider as being a part of the controller 16 and ROM 20 of FIG. 1.

The apparatus of FIG. 3 may be used to render source images into an output image 204 of the composite buffer 18 under a number of different formats. Under a first format the rendered image 202 may be rendered against a blank background. Under the first format the controller 16 first draws a blank background into each of the output image pixel locations of the composite buffer 18. Under a second format the controller 16 may first fill the output image 204 with a first image from one of the buffers 12, 14 and overlay the first image with a rendered image 202 from the second buffer 12, 14.

To render the effect image 202 the controller 16 relies on information from a number of listings within a look-up table stored within ROM 20. Under one embodiment the look-up table of FIG. 6 contains three listings. The first listing is an Effect Axis (EA look-up table) 306, the second listing is a Scan Axis (SA look-up table) 304, and the third listing is the Group of Pixels (GOP look-up table) 302. The Scan Axis Look-up Table and Effect Axis Look-up Table are used in generating the pixel coordinates along the effect axis in the rendered image 202 and the GOP look-up table is used to generate the pixel coordinates in the source buffer 12, 14.

Figure 4:
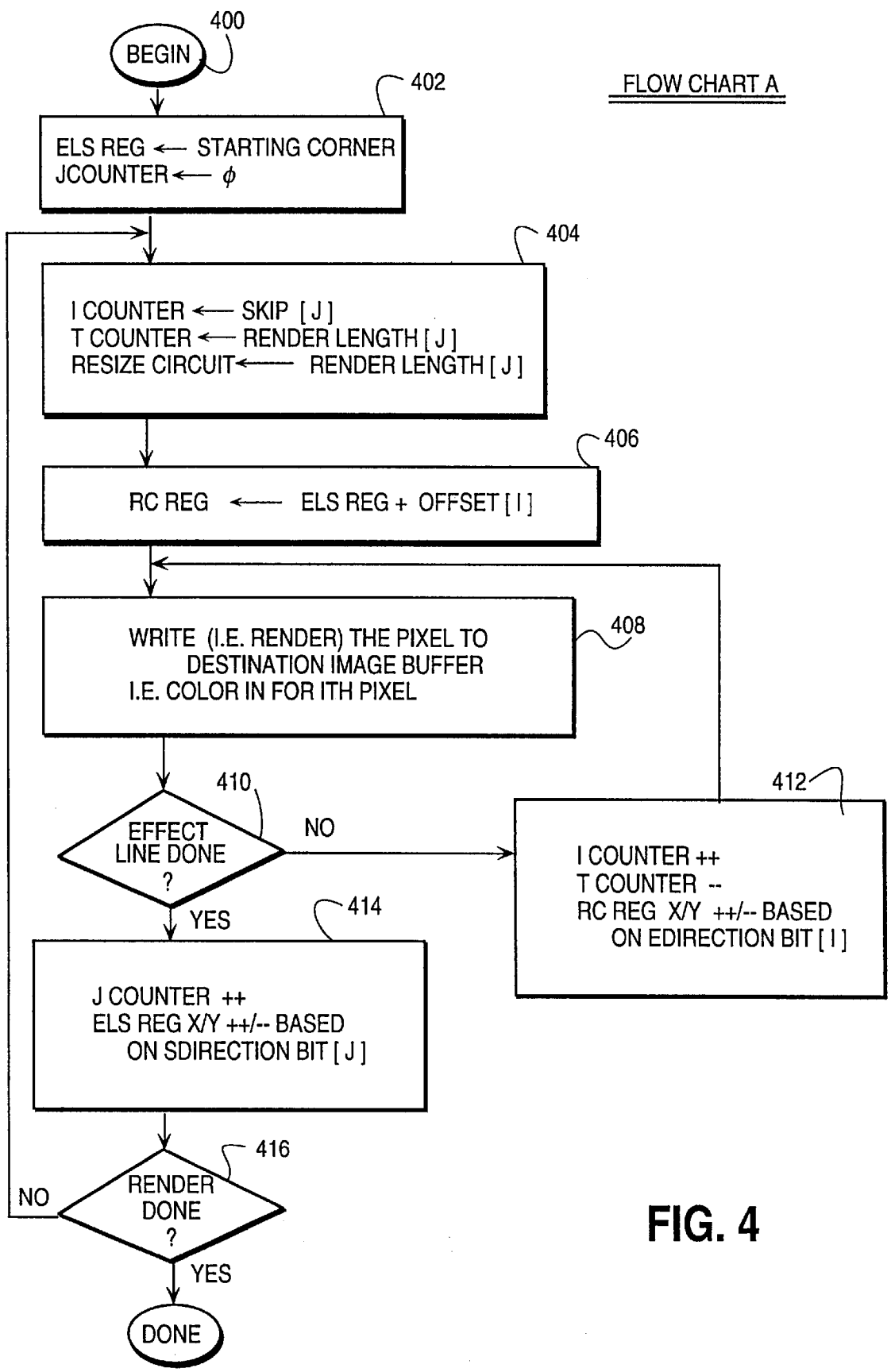
FIG. 4 is a flow chart of the Parallelogram Rendering Engine of FIG. 3
Figure 5:
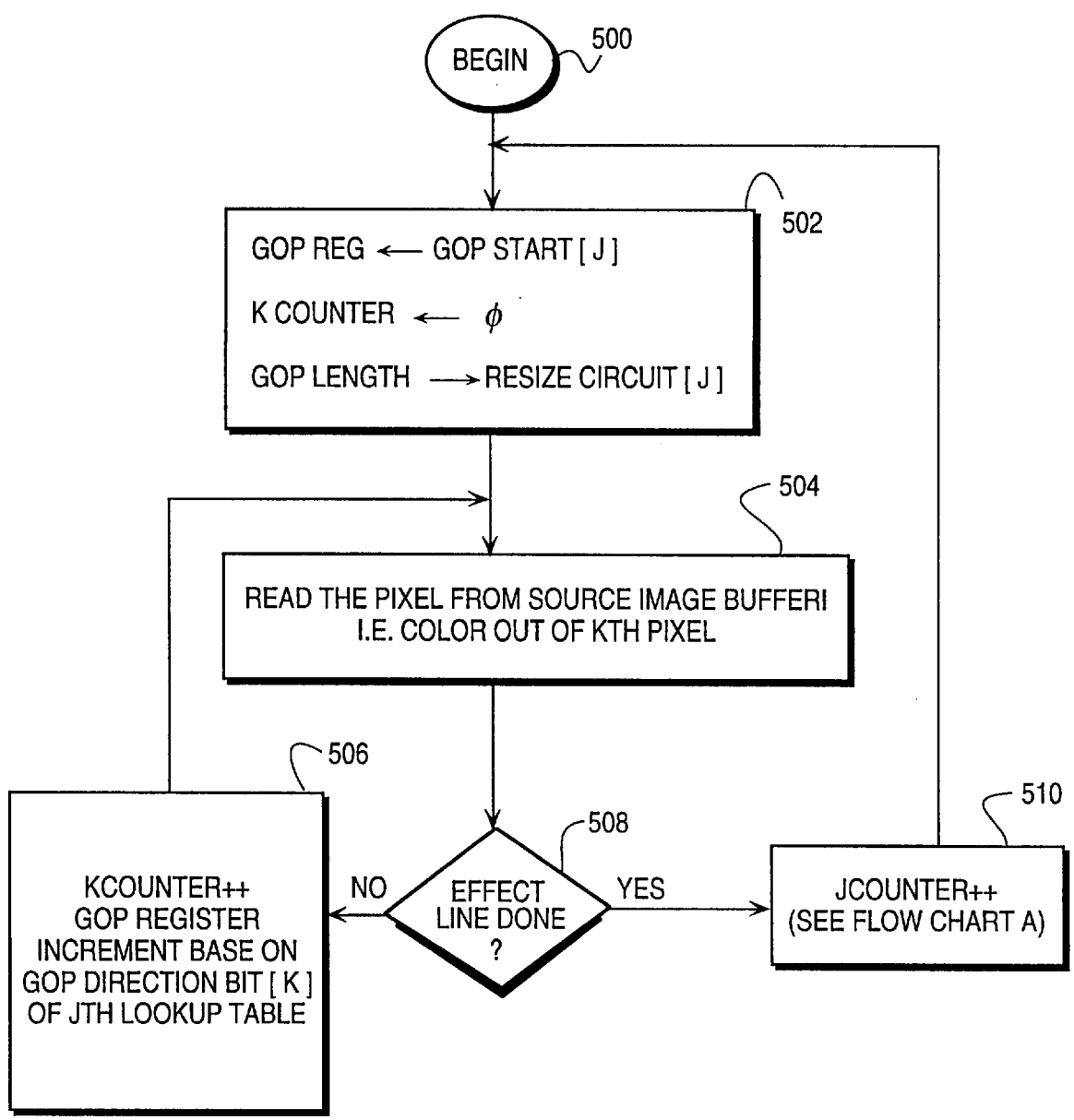
FIG. 5 is a flow chart of the source pixel identification process of FIG. 3.

To aid the reader in understanding the processes associated with rendering an image under the embodiment, the reader is referred to two flow charts in FIGS. 4 and 5. The first flow chart B shown in FIG. 5 summarizes the process steps of generating the pixel coordinates of the source image within the appropriate source buffer 12, 14. The second flow chart A shown in FIG. 4 summarizes the process steps in generating the pixel locations in the rendered image 202 in the output image 202 created within the composite buffer 18. As each source and rendered pixel location is identified, the controller 16 writes the pixel value from the source pixel location to the rendered pixel location, thereby rendering the image 202 into the composite buffer 18.

The Scan Axis look-up table contains at least four fields for each entry. The first entry (i.e., S-Direction bits) specifies which direction in either the x or y direction the controller 16 must increment to reach the next point on the scan axis. The second field (i.e., SKIP) specifies how far along the effect axis from the starting point on the scan axis the controller 16 must go before reaching the first pixel to render. The third field (i.e., Render Length) specifies how many pixels the controller 16 must render along that effect line. The fourth field (i.e., Edge Pair Offset) specifies the difference between the coordinates of the two intersection pixels in the pixel pair.

The EA look-up table contains at least two fields. The first field (i.e., Offset) specifies the coordinate of the ith pixel relative to the first pixel rendered on the effect axis. The second field (i.e., E Direction Bits) specifies in what direction the controller is to move in incrementing from a currently rendered pixel to the next pixel to be rendered.

To render an image (see flow chart A in FIG. 4) a starting corner coordinate register 308 loads 402 a starting corner into the effect line register (i.e., ELS Reg) 310. A zero value is also loaded 402 into a Scan Line Register (i.e., j counter) 312 and a Scan Axis Length (number of pixels in the locus of points defining the scan axis 206) is loaded into a Render Done Comparator 322. The loading 402 of the starting point into the ELS register 310 identifies the first rendered pixel. The loading 402 of a zero into the j counter 312 causes a pointer of the SA look-up table to point to a first entry of the SA look-up table.

The controller 16 increments 404 the ELS register 310 to reach the starting point of the first effect line along the scan axis 206 based upon the S Direction Bits of the first entry of the SA look-up table. If the starting corner is the coordinate of the first pixel of the scan axis 206, then the S Direction Bits of the first entry would be zero. The ELS Reg 310 now contains the coordinate of the first point of the locus of points which defines the scan axis 206.

If the rendered image 202 does not touch the first effect line, then controller 16 must quickly move along the scan axis 206 by a value equal to the distance between the first effect line and the effect line that first crosses the rendered image 202. The controller 16 moves to the effect line that first crosses the rendered image by virtue of a zero value entered into the Render Length field of the SA look-up table 304 for each non-crossing effect line. A zero value in the Render Length causes the T Counter 316 to immediately increment to the next effect line and the j counter 312 to quickly increment through the non-crossing effect lines.

The controller 16 must next move along the effect line to a first pixel to be rendered. To reach the first pixel, the controller 18 must skip 404 along the effect line by an offset value equal to a distance between the scan axis 206 and the first pixel to be rendered on the edge of the outline 202. The controller skips to first pixel by adding the contents of the ELS Reg 310 to the contents of the Offset field of the EA look-up table 306 within the adder 320. The proper entry of the Offset field is identified within the EA look-up table 306 by a current value of the i counter 328 based upon the contents of the SKIP field of the SA look-up table 304. The sum produced at the output of the adder 320 by adding the ELS Reg 310 and Offset value are then entered into the RC Reg 314 as the coordinates of the first rendered pixel within the composite buffer 18.

To reach the next pixel, the controller 16 increments along the effect line before rendering the next pixel. The controller 16 increments to the proper position by incrementing the rendering coordinate register (i.e., the RC Reg) 314 by either an x or y value where the direction of each increment (x and y) is specified in the EA look-up table (i.e., E Direction Bits). The termination counter (i.e., T Counter) 316 is loaded with the number of pixels to be rendered along the effect line.

The j-counter is also provided as an input to the GOP look-up table as a means of identifying a look-up table entry. A j-value of zero identifies the first entry. The first entry of the GOP look-up table may be a starting coordinate for scanning for the source image 12, 14. The starting coordinate is loaded into the GOP Reg 318. The controller 16 also loads a zero value into a K Counter 326. The K Counter 326 contains a number of a source pixel as the controller 16 moves along the K line of FIG. 2a retrieving pixels one at a time from the source buffer 12, 14 into a destination pixel specified in RC Reg 314.

The rendering apparatus 10 of FIG. 3 also contains a resizing register (Resize Circuit) 324 for accommodating differences in pixel length between the source image 12, 14 and the effect line of the rendered image 202. The Resize Circuit 324 simultaneously controls incrementing along the source scan line (K of FIG. 2a) and the effect line of FIG. 2b.

Figure 2C:
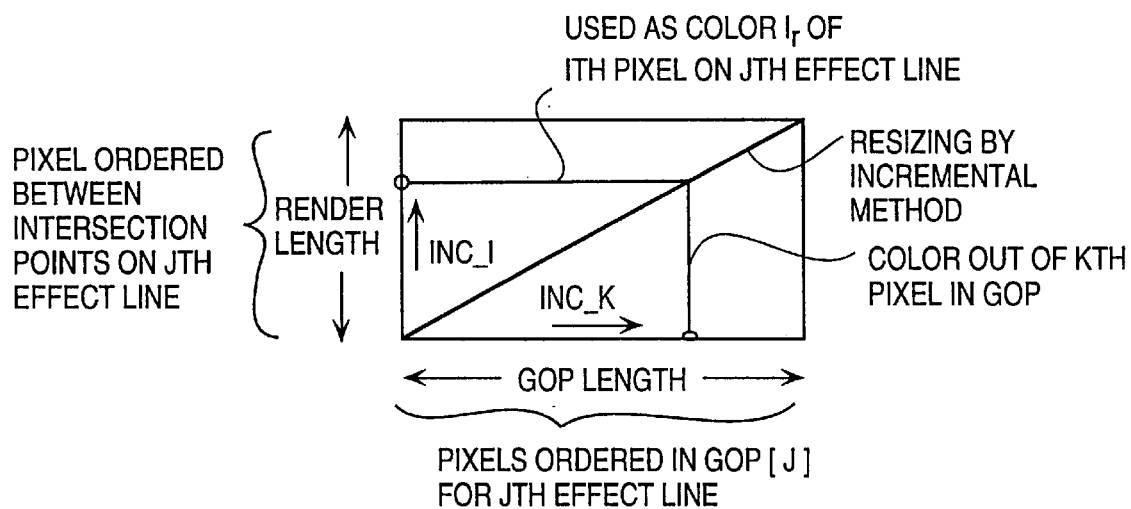

Under the embodiment, the Resize Circuit 324 may function based upon a fourth look-up table, the contents of which may be summarized by FIG. 2c, or an algorithm (e.g., incremental line drawing) that simulates the function of FIG. 2c may be used. FIG. 2c represents one case where a GOP length is greater than a render length. It should be apparent to those of skill in the art that a similar relationship can be established where the render length is greater than the GOP length.

As the controller 16 unidirectional proceeds through the parallelogram scan, the controller 16 generates a Scan Axis Increment pulse which increments the j counter 312. Incrementing the j counter 312 causes pointers within the GOP look-up table and SA look-up tables to identify different entries. A new GOP start point is loaded into the GOP Reg 318. The Scan Axis Increment pulse also causes the Resize Circuit 324 to load GOP and render lengths. A new effect line start point is created by adding the S Direction Bits to the coordinate in the ELS Reg 310, which may then be loaded into the RC Reg 314.

Upon loading the GOP Reg 318 and RC Reg 314, the pixel identified by the contents of the GOP Reg 318 is loaded into the pixel identified by the contents of the RC Reg 314 through the switch 328 under the control of the Resize Circuit 324. After rendering the pixel, the controller 16 increments either the i or K counter based upon movement along the diagonal of FIG. 2c.

Based upon position on the diagonal of FIG. 2c the Resize Circuit 324 may or may not increment the K counter 326. Where the K counter is incremented, the new K value identifies a new entry within the GOP look-up table which may generate K Direction Bits (x and/or y) which are then added to the contents of the GOP Reg 318.

Based upon position on the diagonal of FIG. 2c, the Resize Circuit 324 may, or may not, increment the i counter 328. Where the i counter is incremented, the new contents of the i counter 328 causes a new entry of the EA look-up table to be processed. The new entry of the EA look-up table may cause a new E Direction Bit (x or y) to be added to the contents of the RC Reg 314.

As before, the pixel of the source buffer 12, 14 identified by the contents of the GOP Reg 318 is loaded into the pixel of the rendered image 202 identified by the contents of the RC Reg 314.

The T Counter is incremented by each INC_I pulse. When the i count equals the skip length plus the render length, the T Counter provides a Effect Line Done output signal.

The Effect Line Done output causes the controller to generate a Scan Line Increment pulse. The Scan Line Increment pulse causes the j counter 312 to again increment presenting a new j value to the GOP look-up table and SA look-up table and for the Resize Circuit to load a new GOP and render length.

The contents of the j counter 312 is compared with the Scan Axis Length within the Render Done Comparator 322. When the j counter value equals the Scan Axis length value the Render Done Comparator provides an output to the controller 16 indicating that rendering is complete.

The rendered image of FIG. 2b may be used by itself or may be part of a sequence of images of a video display. Where the image is a part of a sequence of images the outline of the sequence of images is typically progressively modified to provide a transition effect from a first video image to a second video image. Where used for such purposes the video transitioning system 10 may provide an indication of transitioning between video sources through such visual clues (visual graphics displays) as page turning, page rolling, wave transition, cut-in, cut-out, etc.

Transitioning between video sources using video graphics involves a number of sequential steps. Where page turning is the selected mode, a corner of the first video image lifts, folds over, and proceeds towards an opposite corner before finally merging with and disappearing into the corner.

To achieve such a visual display, a number of transitional images (frames) must be sequentially generated and displayed to provide the effect of page turning. Under the embodiment, a controller 16 of the transitioning system 10 may generate a completed image of a transition frame of the sequence of frames within a composite buffer (COMP BUFF) 18 through use of an outline stored in a look-up table stored in ROM 20 or may overlay the outline on the geometric figure used to create the graphics effect on the composite memory as a prelude to rendering a transition image. The overlay may simply be a geometric or other design (as used herein, the term "geometric design" means geometric, pictorial, or graphic designs) made up of line elements stored in adjacent pixel locations of the two-dimensional matrix of the composite buffer 18 and through which the controller 16 sweeps using parallelogram scanning one row at a time using the lines of the geometric design (i.e., the locus of pixels) as trigger points for selecting one video signal over another.

To use the video transitioning system, an operator (not shown) of the transitioning system 10 selects the type of transition between video sources through a video transitioning select port (Video Select) on the controller 16. The video select port allows the operator to identify by the digital code entered through the video select port the location of a subroutine for generating the particular transition required or the digital code identifying a look-up table which summarizes the transition sequence.

Where the system 10 generates its own video transition sequence the digital code entered through the video select port initiates a set of processing steps to generate each frame of the transition sequence. For example, where the transition sequence uses a page turning effect, the controller 16 selects a subroutine in ROM 20 which produces a series of transition images which produce the effect of page turning.

Figure 7:
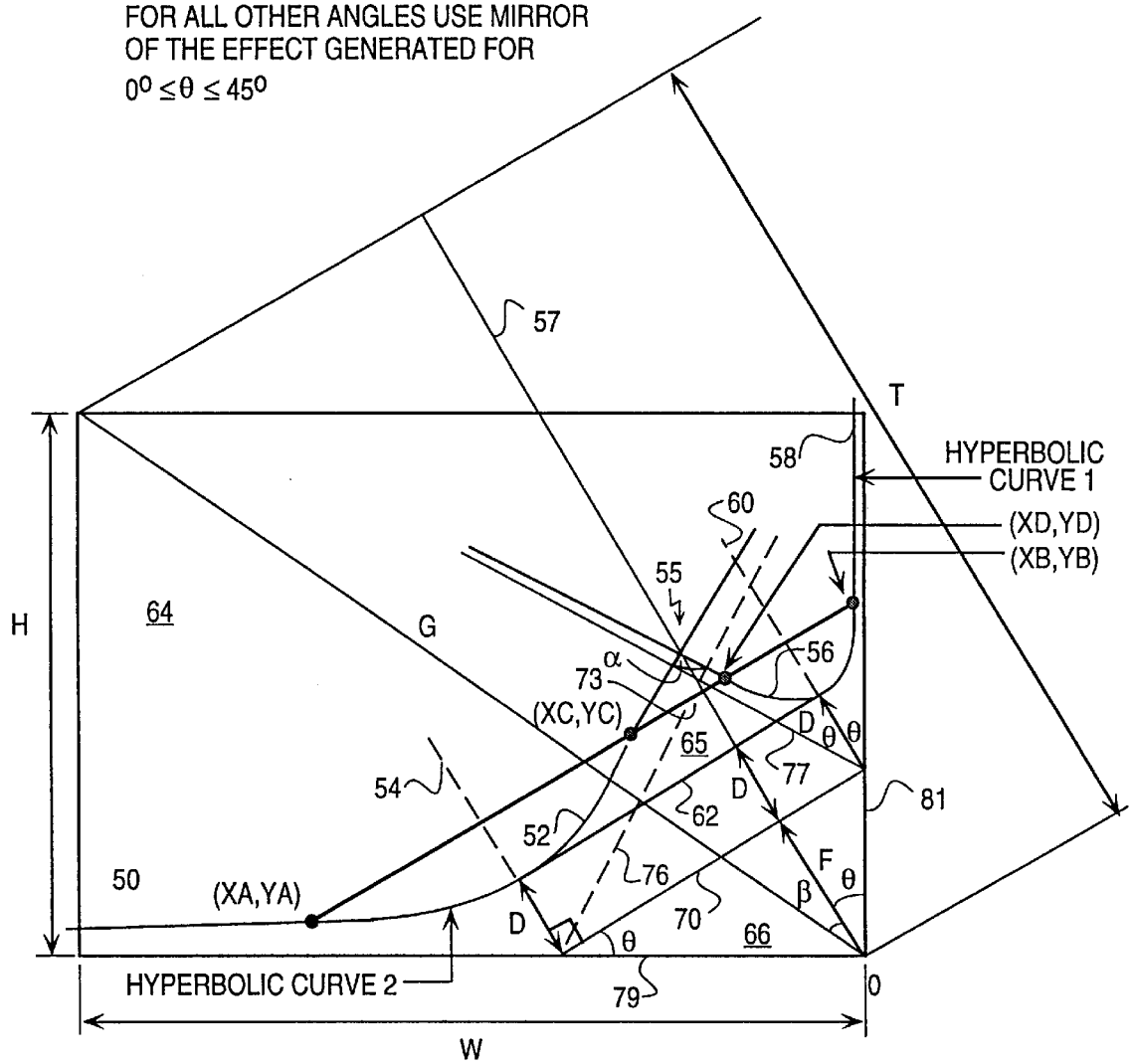
FIG. 7 depicts a geometric outline of a page turning effect rendered by the apparatus of FIG. 1.

FIG. 7 is a graphical representation of a frame of a video transition image of a page-turning transition sequence using a double hyperbola and straight line to define transition points between video sources. The first video area, containing the first video image, is designated 64 and the second video area, containing the second video image, is designated 66. An area depicting a folded-over corner of the first video image is designated 65.

The boundary on the lower part of the image of FIG. 7, between the first video area 64 and the second video area 66, is defined by the left half 50 of hyperbolic curve #2. Hyperbolic curve #2 is divided into a right half 52 and a left half 50 by a center axis 52. The right transition boundary between the first video area 64 and the second video area 66 is defined by the right half 58 of hyperbolic curve #1 (shown on the right side of the video transition image). Hyperbolic curve #1 is also divided into a right half 58 and a left half 56 by a center axis 60. The folded-over area 65 of the first video area 64 is bounded on the bottom by the straight line 62 tangent to the hyperbolic curves at the intersection point of the axis 54, 60 and respective hyperbolic curve #1, #2. The straight line 62 represents a predominant edge of page turning progression along an axis 57 of page turning.

The folded-over area 65 is defined on the left side by the right half 52 of the hyperbolic curve #2 between axis 54 and intersection 55 of hyperbolic curves #1 and #2. The folded-over area 65 is defined on the right side by the left half 56 of hyperbolic curve #1 between axis 60 and intersection 55 of the hyperbolic curves.

A frame of the page turning transition sequence (one frame of which is shown in FIG. 7) may be created within the composite buffer 18 first by drawing the lines 50, 52, 56, 58, 62 of the geometric design and then by scanning and storing appropriate coordinates of the lines of the composite buffer 18 within a look-up table. The geometric design for each frame of the transition sequence is created by first selecting a pageturning angle θ, a radius of the flipped page R, and percentage completion P of page turning.

The page turning angle θ effectively defines which side of the image will be folded-over at the fastest rate during page turning. For example at angle of 0 (θ=0) the bottom edge would be folded-over from bottom to top covering the first video image as the second video image is revealed. At an angle of 90 degrees, the right side of the image would be folded from right to left. At an angle of 45 degrees the bottom and right sides would be folded at equal rates.

Figure 8:
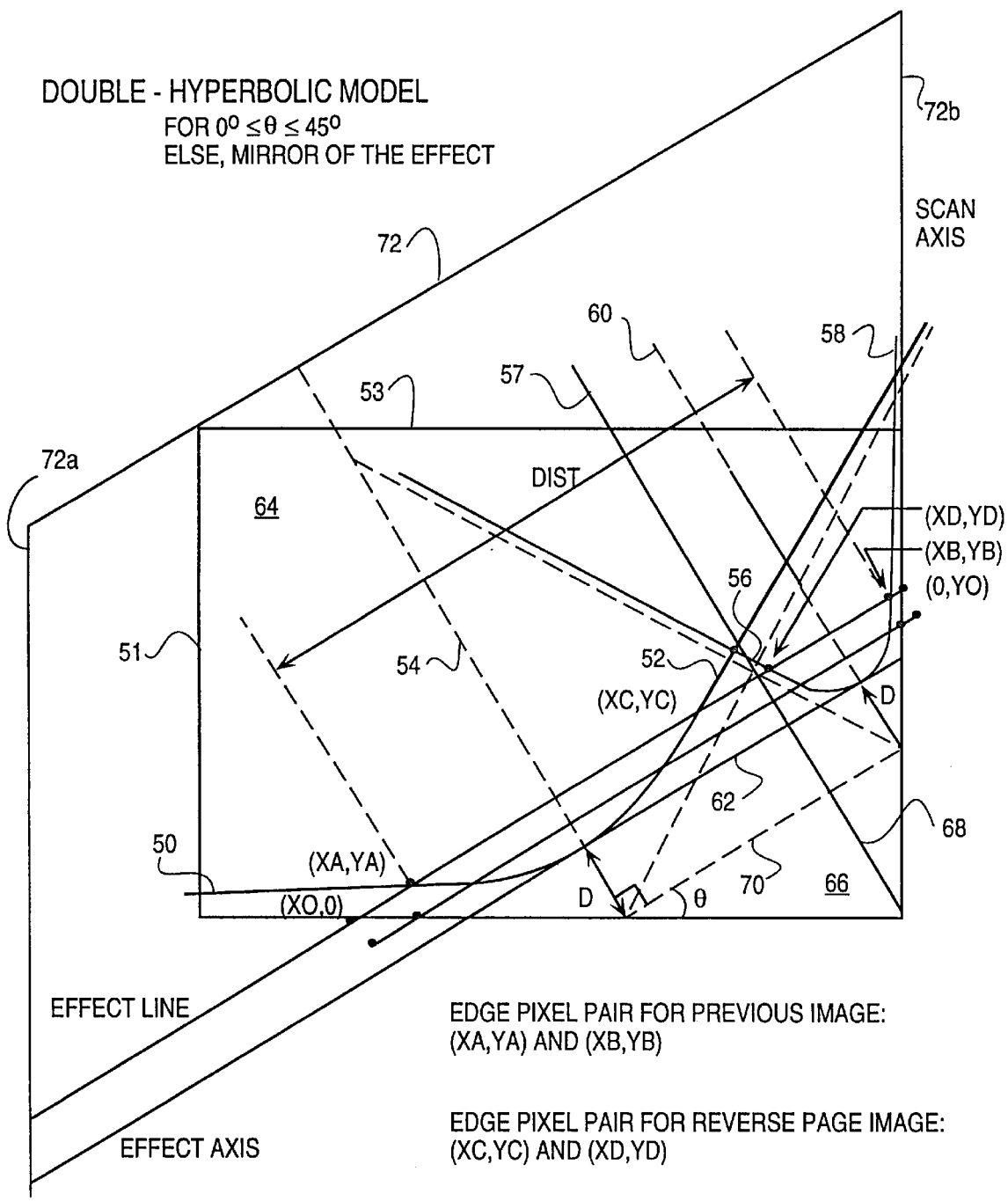
FIG. 8 depicts the geometric outline of FIG. 7 of page turning with a parallelogram scanning structure imposed on the transition video image.

The radius of the flipped page R represents the height of the point 55 above the plane of the first video image 64. If the radius R is small, the curve of the first 52 and second 58 hyperbolas will be very small and the point 55 of the folded-over page will appear to extend only a very short distance over the first video image 64. If the radius R is relatively large (as shown in FIGS. 7 and 8) the bend of the hyperbolas will be fairly wide and the point 55 will appear to extend a considerable distance over the first image 64. Where R is zero, the hyperbolas degenerate into flat lines simulating the effect of a flat fold.

The percentage completion P of page turning is a progressive function and is numerically equal to the value of the expression (F+D)/T. At zero percentage (P=0), the sum of F and D is zero and the first image appears flat, completely covering the second video image. Where the line 62 reaches half-way (T/2) on the dominant axis of progression 57 of page turning the percentage of completion P equals 50%.

Figure 9:
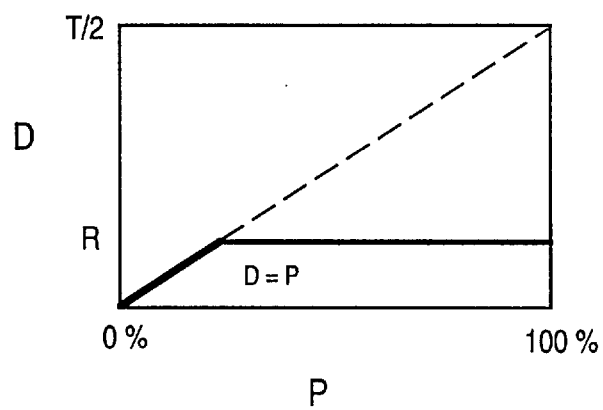
FIG. 9 depicts the percentage of page lift versus percentage of page turn for the transition video image of FIG. 1.

Another value that may be defined is a variable value D which may be thought of as a substitute value for R over a part of the page turning sequence. While the radius of the flipped page R may be held constant over much of the page turning sequence at a constant value generally depicted as R, the initial value of the page turning radius D beings at zero when page turning first begins. The value is D is generally increased as page turning progresses at a linear rate. FIG. 9 depicts a graphical approach to determining D. As shown, D equals F for a portion of the page turn. After, D becomes equal to R, D remains constant for the rest of the page turn sequence.

The use of the double hyperbola of FIG. 7 allows for the realistic simulation of page turning by providing independent means of simulating the curvature on opposing sides of the turned edge. The use of independent variables θ, P, D allow the page turning effect to be easily modified to reflect a variety of different page turning features.

Turning now to the transition image of FIGS. 7 and 3, the rendering of the transition image begins with a calculation of a locus of point defining the geometric outline of the page turning effect. The geometric outline of the page turning effect, in turn, is created through the use of the first and second hyperbola. To this end hyperbolic curve #1 may be defined by the equation:

$$y = a_1 x + b_1/x + c_1,$$

where $$a_1 = \tan(\pi/2 - 2\theta),$$

$$b_1 = D^2 \sin\theta \cos\theta - \tan(\pi/2 - 2\theta) D^2 \sin^2\theta, \text{ and}$$

$$c_1 = F/\cos\theta = (PT - D)/\cos\theta.$$

Similarly, hyperbolic curve #2 can be defined by the equation:

$$x = a_2 y + b_2/y + c_2,$$

where $$a_2 = \tan(\pi/2 - 2\theta),$$

$$b_2 = D^2 \sin\theta \cos\theta - \tan(\pi/2 - 2\theta) D^2 \cos^2\theta, \text{ and}$$

$$c_2 = F/\sin\theta = (PT - D)/\sin\theta.$$

The value T may be further defined by the equality:

$$T = G\cos\beta,$$

where $$G = (H^2 + W^2)^{1/2} = \text{diagonal length of screen, and}$$

$$\beta = \tan^{-1}(W/H) - \theta.$$

The locus of points for hyperbolic curves #1 and #2 may be calculated using the equations (and θ) as shown for any direction in the first octant. For other values of θ the sign of either x or y is changed or the relative positions of x and y is changed.

To create a transition video image of a sequence of video images, the controller 16 outlines the geometric figures (double hyperbolas) into memory which memory locations closely approximate the coordinates of the double hyperbolas on the transition video image. The controller 16 then creates a scan envelope 72 (i.e., a parallelogram of angle θ) containing the outline of the geometric image for purposes of generating transition coordinate locations (pixel pairs) where the transition image changes from one video source to another. The controller 16 may then complete the image by scanning along the effect lines, writing into the composite buffer 18 from the first and second video sources in VIDEO BUFF 12, 14 and using the pixel pairs as trigger points for selecting one video source over another.

Under a second embodiment of the invention, the pixel pairs are pre-computed and stored in a look-up table in ROM 20 along with a locus of points defining the scan envelope 72. The controller 16 under the second embodiment creates the page turning effect of FIGS. 7 and 8 by simply retrieving the pixel pairs from ROM 20 one at a time while stepping through the scan envelope one effect line at a time.

Under either embodiment, the parallelogram 72 created by the controller 16 is bounded by a pair of scan axis lines on the right and left of the parallelogram. The two scan axis lines are joined in between by a series of effect lines which are parallel to the predominant edge 62 in the progression of page turning, which the controller 16 of the first embodiment scans in sequential order to identify the outline.

To initially outline the geometric image into the composite buffer 18 under the first embodiment, the controller 18 may first write a specific background pixel color value (e.g., black) into each memory element of the composite buffer 18. The controller 16 may then use the hyperbolic equations described above to outline the geometric figures into the composite memory 18 by storing a specific color value into the locations of the locus of locations defining the geometric figures using the incremental line drawing routine and parallelogram scanning. Under the embodiment, the controller 16 then scans the effect lines covering the geometric figure at an angle θ, parallel to the edge of the regressing edge 62 of the first video image. The controller may scan the image starting with the upper left and proceed to the lifting corner (lower right in FIGS. 7 and 8).

Storing a complete transition frame directly into the composite buffer offers a number of advantages in terms of video effects possible. Under an embodiment of the invention, the folded-over area 65 may be given a reversed appearance of what originally may be thought of as having being on the other side.

As the controller 16 scans the effect lines (at the scan angle of θ) to create markers, the controller 16 may also write pixels from the first video source 12 into the folded-over area (in addition to the markers). The controller 16 may fill-in the folded-over area 65 by scanning in the opposite direction (lower right to upper left) along the scan axis while writing into the folded-over area 65 while continuing to scan the source buffer 12, 14 from upper left to lower right. The net effect of such opposite direction scanning is that the source material in the lower right corner of the source image is written into the folded over area 65 of the composite buffer 18 in a reversed order to create a reversed appearance.

The controller 16 accomplishes the creation of the reversed image in the folded-over area 65 by first selecting the pixel pair at opposing ends of line 62. The controller then identifies a pixel pair in the source image that corresponds to the pixels at opposing ends of line 70 along the periphery of the image. The controller 16 scans upwards and to the left in the composite buffer 18 using adjacent pixel pairs selected from the locus of points that define hyperbolic lines 52 and 56. The controller 16 scans downwards and to the right in the source image 12, 14 using adjacent pixel pairs from the locus of points that defines the periphery of the image, moving towards the origin in the lower right corner.

For each pixel pair in both composite and source image, the controller uses incremental line drawing to identify a locus of points (effect line) connecting each pixel pair. The first pixel of the source image 12, 14 that corresponds to the location of the lower left end of line 70 is written into the composite buffer at the pixel location of the lower left end of line 62. As the controller 16 moves upwards and to the right in the source image 12, 14 along the effect line that corresponds to line 70, each adjacent pixel is written into adjacent pixel location along line 62 in the composite buffer 18.

The next effect line in the source image 12, 14 is defined by the next adjacent pixel pair moving towards the origin in the lower right corner. The next effect line in the composite buffer 18 is defined by the next adjacent pixel pair moving upwards and to the left along hyperbolic lines 52 and 56. As before, as the controller scans upwards and to the right along the corresponding effect lines in both source and composite buffers, pixels from the source image 12, 14 is written into the composite buffer 18.

As the controller 16 moves upwards and to the left along hyperbolic lines 52 and 56, the length of the effect lines becomes shorter than the effect lines in the source image 12, 14. To accommodate the difference the controller 16 may use the Resize Circuit 324 of FIG. 3.

After completing the folded-over section, using a scan line of θ of the scan envelope 72, the controller 16 fills in the rest of the composite buffer 18 as described above. The controller then outputs the completed transition frame on the output.

In another embodiment of the invention, the outline of the geometric form (e.g., the page-turning effect of FIG. 7) is stored in ROM 20 as a look-up table. Line 50 is stored as a locus of points (pixel locations) along with an indicia of transition (i.e., an identifier which video signals are to be found on each side of the transition point). Similarly line 52 is stored as a locus of points with indicia of a transition, line 62 is stored as a locus of point with indicia of a transition, line 56 is stored as a locus of points with indicia of a transition, and line 58 is stored as a locus of points with indicia of transition. A locus of points that defines the periphery of the image 51, 53 is also stored as a locus of points with indicia of transition. Under the embodiment, lines 50, 51, 52, 53, 62, 56, and 58 comprise the outline of the geometric figure.

To render the page turning effect of FIG. 7, a scan envelope 72 (FIG. 8) is created around the geometric figure that defines the page turning effect. A locus of points 72a, 72b define opposing ends of effect lines of parallelogram scanning. A set of coordinates (one at the top of line 72a and one at the top of line 72b) define the first pixel pair that is used to generate the first effect line of parallelogram scanning. Adjacent coordinates moving down the scan axis become the pixel pairs used to generate subsequent effect lines. The pixel pairs used to generate the scan envelope 72 may also be stored in ROM 20.

The pixel pairs that define the effect lines of the scan envelope 72 are chosen to be parallel to line 62. Line 62 defines an edge of page turning along a predominant axis of progression of the page turning.

The pixel in the upper left corner of the periphery of the frame (the point where lines 51 and 53 intersect) becomes the starting point (first rendered pixel). Since the first rendered pixel is among the locus of pixels defining the geometric figure the first pixel has indicia of transition stored with it that indicates to the controller 16 that the pixel should be render from the first video buffer 12. Also, since the first pixel is both a starting and ending pixel as far as rendering length the indicia of transition stored with the pixel also informs the controller that it is the only pixel to be rendered.

The use of the incremental line drawing routine along the perpendicular edge following the predominant axis of progression allows each pixel along the path to be rendered without leaving gaps or missing pixels. Under the embodiment, as pixels are identified using incremental line drawing between pixel pairs, a color value from the appropriate video source may be stored directly into the identified coordinate of the composite buffer 18 for a particular scan line. Since color values are being stored into the composite buffer 18 directly from the input buffers 12, 14 during the scan of the effect line along the scan axis, the interpretation of the transition points differs somewhat as from previous examples. As the scan moves from the lower left of FIG. 8

(along the effect line) an encounter with the left arm 50 of the second hyperbolic curve results in a transition from the second video image to the first video image. Similarly, as the scan moves across the right arm 52 of the second hyperbolic curve, the source changes from the first video source to solid color and then back to the first video image after the scan passes the left arm 56 of the first hyperbolic curve and then back to the second image as the scan passes the right arm 58 of the first video image. After rendering the page turning effect within the composite buffer 18, an output of the rendered image may then be provided directly from the composite buffer 18 by horizontally scanning the image of the composite buffer 18 and transferring the scanned values directly to VIDEO OUT.

The use of incremental line drawing provides a two-dimensional mechanism for avoiding non-rendered gaps (pixels) in the scanned lines of the manipulated images along the edge of the page perpendicular to the predominant axis of progression. The use of the incremental line drawing routine along the scan axis further avoids gaps caused by missing scan lines. Such a benefit may be optimized in a system using reverse mapping from primary video sources. Reverse mapping in such a system renders the output image into the composite buffer 18 one pixel at a time from corresponding pixels of the original image.

In another embodiment of the invention, the distortion normally perceived in page turning may be produced by directly using the two intersection points of each effect line to identify the line segment in the source image corresponding to the effect line. Under the embodiment, the page turning outline 50, 52, 56, 58, and 62 is stored as a locus of point in ROM 20. A set of pixel pairs of each effect line to be scanned of both source and composite buffers 12, 18 is also stored in ROM 20. Under the embodiment, the controller 16 renders the entire image into the COMP BUFF 18 one line at a time scanning along the effect lines of the parallelogram using incremental line drawing between the pixel pairs of the scan axis.

As the controller 16 scans between the outside boundaries of the image 79, 81 parallel to line 62 the controller 16 selects the second video image from the VIDEO BUFF 14 while the scan position is between the x axis 79 and the y axis 81 and while the scan position is between the origin 0 and line 62. The scan line increments one line a time downwards and to the right in FIG. 8 using the locus of points stored in ROM 20.

The hyperbolic curve algorithm selects pixels from the first video buffer 12 using the incremental line drawing routine using starting points derived from the image outline. Since opposing ends of the scan line $x_a$, $y_a$ and $x_b$, $y_b$ can be thought of as opposing ends of a scan line of the first video image beginning on the x and y axis, the selection of pixels can be based upon the offset of opposing ends of the scan lines.

For example, if the Cartesian origin of FIG. 8 is the lower right corner, then the mapped site of the origin of the first video source 12 projected into FIG. 2 in the x direction is the location represented by $x_b$ and in the y direction by $y_a$. To map pixels into the page turning image for each scan line of the composite buffer 18, the corresponding scan line within the first video image in the first video buffer 12 begins at $(x_a-x_b, 0)$ and ends at $(0, y_b-y_a)$ To render the image from the first video source 12, a locus of points for identifying effect lines is stored in ROM 20. Again, the incremental line drawing routine is used to create the pixel selection line (and point) within the first video image in the first video buffer 12 based upon starting and ending point.

Using the pixel pair coordinates along the hyperbolic lines 50, 58 to identify pixels within the first video image stored in the first video buffer 12 allows the rendering of the first video image into the appropriate location 64 of FIG. 2 with a distortion factor that closely simulates page turning. The use of the stored scan line pixel pairs in ROM 20 allows rendering to be performed without multiplication or division.

Figure 10:
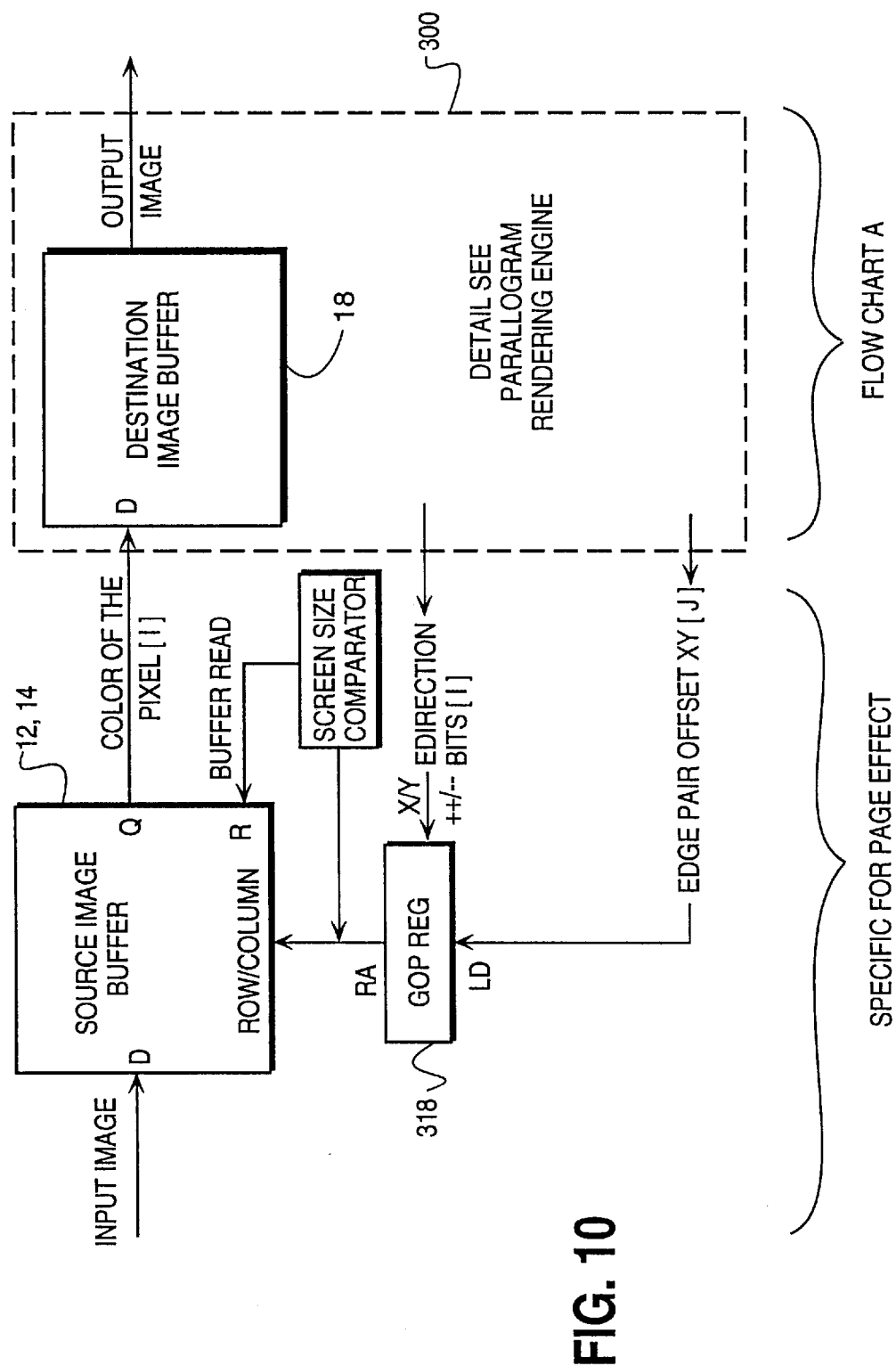
FIG. 10 is a simplified information flow diagram of FIG. 3.

The apparatus used to generate page turning (FIGS. 7 and 8) may be somewhat simpler than that shown in FIG. 3. For example, the apparatus of FIG. 10 may be used to generate the effect of FIGS. 7 and 8. As shown (FIG. 10) the Parallelogram Rendering Engine 300 is identical to that shown in FIG. 3, but the scanning apparatus of the source image 12, 14 is considerably simplified.

Rendering of the image of FIGS. 7 and 8 is considerable simplified by the assumption that the effect lines of source and composite buffers are in the same direction and are the same length. Since the effect lines are the same direction and length, the same E Direction Bits are used to identify pixels along an effect line direction in both composite and source buffers. The Edge Pair Offset [j] (i.e., $(x_a-x_b, 0)$) are loaded into the GOP Reg 318 of FIG. 10 as the starting position in the source buffer 12, 14.

The applicant has determined that a wide variety of images may be rendered with considerable ease by the proper selection of the location and orientation of the parallelogram envelope (scan envelope) surrounding the image to be rendered. Under the embodiment, a locus of points of the outline (e.g., line 62 of FIG. 2) may be selected for a first scan line or the locus of points of the first scan line may be chosen based upon some perceived efficiency of a selected orientation related to the image to be rendered. Subsequent scan lines are generated adjacent the first scan line by incremental line drawing. The starting and ending points of the subsequent scan lines may also determined along lines 50 and 58 by incremental line drawing, but are preferably stored in a look-up table. Scanning occurs unidirectionally along each effect line and scan axis by the generation of a number of substantially parallel effect lines moving downward and to the right, such as shown in FIG. 8.

Figure 11:
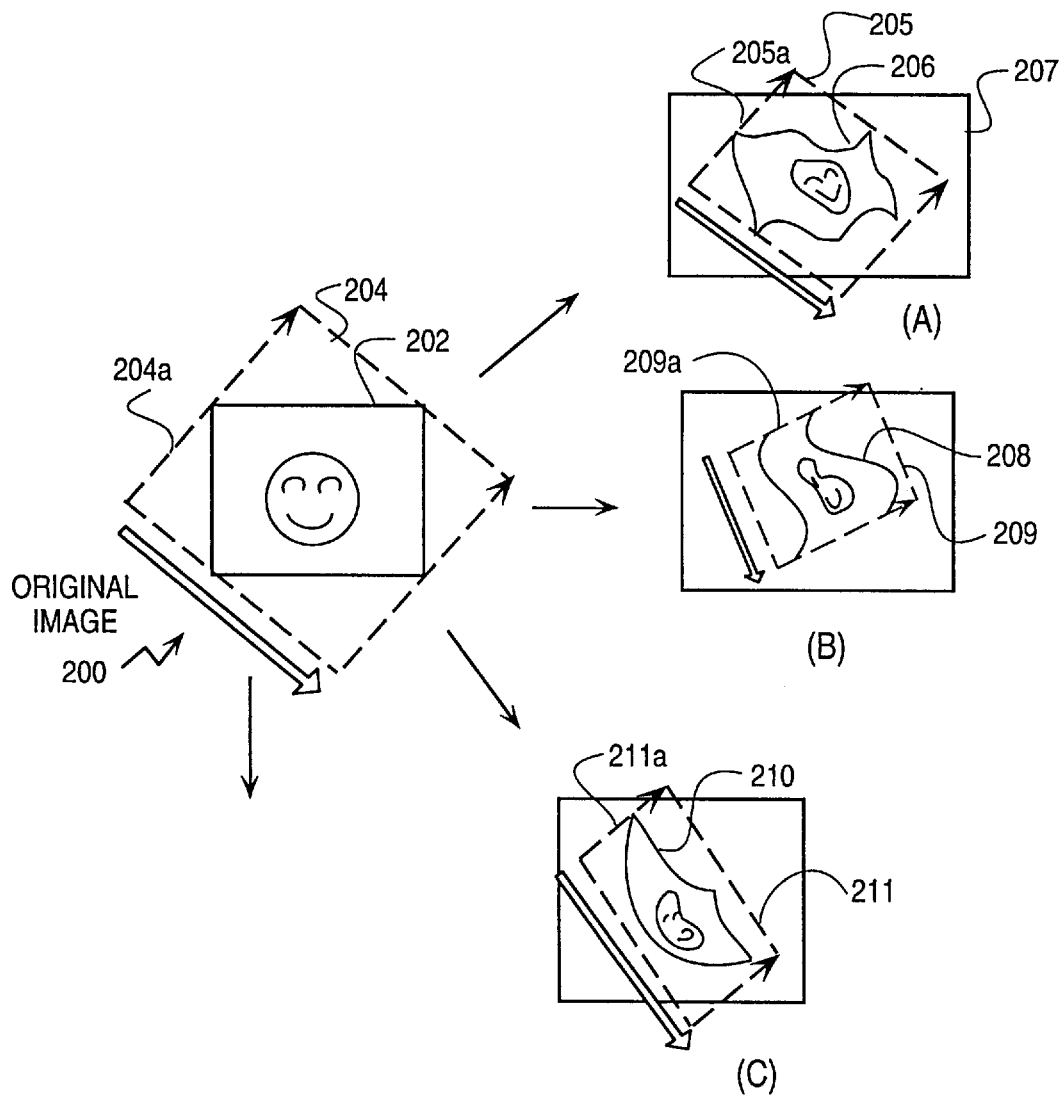
FIGS. 11A–C depicts examples of alternating images of the apparatus of FIG. 1.

FIG. 11 is a further set of examples in accordance with the embodiment. As shown, an original image, (i.e., a smiley face) is shown rendered from a two-dimensional array 200 of the VIDEO BUFF 12 into four separate images (A-C) created within the COMP BUFF 18. As shown the original image may be scanned through the use of a surrounding parallelogram 204 substantially in the form of a rectangle. A locus of point of the parallelogram 204 is stored in ROM 20 as an image source along with a locus of points 202 of the original image.

The effect lines (i.e., the dotted lines) of the parallelogram 204 are chosen to proceed upwards and to the right while the scan axis (i.e., the double lines) proceeds downward and to the right. A locus of points 204 of the two-dimensional image array 18 is generated, as shown, outside the image area with the locus on the upper left 204a used as a first scan line. Subsequent scan lines are generated adjacent to and progress downward and to the right using the above described incremental line drawing routine.

In image A the original image 200 is rendered using a variety of special effects. In image A, coordinates of an outline 206 of the special effect are stored for use in rendering the image. A locus of points of the scanning parallelogram 205 is also stored in ROM 20. The locus of points of the first scan line 205a for image A (i.e., the upper left side of parallelogram 206) may be the same locus of points as for the scan of the original image 200 or the locus of points may be chosen as shown in image A to be inside the image area of the two-dimensional array 207. As image A is generated, corresponding pixels from the original image 200 are rendered into image A based upon scan line and relationship to the outline 206. Differences in scanning length along the scan line between opposing sides of the outline 202 of the original image 200 and opposing sides of the rendered image 206 may be accommodated by well known sizing routines.

In image B another special effect is rendered. In image B the parallelogram 209 is shown rotated clockwise over the parallelogram 204 of the original image 200. The outline 208 also has been modified to produce certain distortions of the smiley face. The effect on the smiley face of image B, in general, may be created by the changing starting points of the outline coordinates 208 and parallelogram 209 or may be further modified by the appropriate sizing algorithms used to ensure that a scan line of the original image 200 fits within the corresponding scan line of the rendered image B.

Image C shows a further special effect where the starting scan line 211a is moved into the image area. The outline 210 is also used in conjunction with scan line sizing routines to create the images shown.

The description of the images rendered in FIG. 11 has purposely been limited to the area within the outlines 202, 206, 208. The remainder of the image area (i.e., outside outlines 202, 206, 208) of images A, B, C may be painted as a solid color before rendering or painted with another image with the rendered image imposed on top of the other image.

In another embodiment, it has been determined that the image information described as being stored in the two-dimensional array could just as easily have been stored in a fragmented memory structure. It is also well known to those of skill in the art that images may be just as easily be stored in memory structures that, in fact, are not arrays but which still fall within the purview of the invention under known processes.

In another embodiment, it has been determined that the referenced look-up tables of ROM 20 could be stored in a mass storage device (e.g., a hard disk drive or floppy disk or RAM). Similarly, the programs stored in ROM 20 could also be stored in a mass storage device (e.g., a hard disk drive or floppy disk or RAM).

A specific embodiment of novel methods and apparatus of rendering a video transition image according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of rendering at least a portion of a rendered image from an image provided by an at least one external source into memory locations of a destination memory having integer x and y pixel coordinates based upon a set of integer coordinates of an outline of the portion of the rendered image, such method comprising the steps of:

superimposing a parallelogram over an area represented by at least some of the memory locations of the destination memory, the parallelogram defined by a parallel series of effect lines forming an angle $\theta$ with either an x or y axis of the x and y pixel coordinates of the destination memory and bounded on opposing ends of the effect lines by a scan axis, the parallelogram surrounding the outline of the portion of the rendered image within at least part of the destination memory; and rendering the image from the at least one external source into the outline of the portion of the rendered image within the parallelogram of the destination memory by scanning one effect line at a time at the angle $\theta$ to either and x or y axis and depositing source information during each scan of an effect line into corresponding memory locations along the effect line and using the outline coordinates as transition points for selection and non-selection of the at least one external source.

2. The method as in claim 1 further comprising the step of selecting an at least one pixel pair defining opposing ends of an at least first effect line of the parallel series of effect lines.

3. The method as in claim 2 further comprising the step of identifying a locus of pixels joining the at least first pixel pair and defining the at least first effect line.

4. The method as in claim 1 further comprising the step of retrieving the coordinates of the outline from a look-up table.

5. The method as in claim 1 further comprising the steps of detecting transition points by comparing each pixel location of a scan with the coordinates of the outline.

6. The method as in claim 1 further comprising the step of generating the coordinates of the outline based upon a set of quadratic equations.

7. The method as in claim 6 wherein the quadratic equations further comprise a pair of hyperbolic equations.

8. The method as in claim 1 wherein the step of rendering the image from the at least one external source into the destination memory while moving unidirectionally along the effect lines and scan axis using the outline coordinates as transition points for selection and non-selection of the image further comprises the step of using incremental line drawing to create a locus of point defining each scan axis.

9. The method as in claim 1 wherein the step of rendering the image from the at least one external source into the destination memory while moving unidirectionally along the effect lines and scan axis using the outline coordinates as transition points for selection and non-selection of the image further comprises the step of using incremental line drawing to create a locus of point defining each effect line.

10. The method as in claim 1 further comprising the step of outlining the transition image on a two-dimensional transition image memory.

11. The method as in claim 10 further comprising the step of painting the two-dimensional image memory with a background color.

12. The method as in claim 11 further comprising the step of outlining the transition image on the two-dimensional transition image memory using an outlining pixel color against the background color.

13. The method as in claim 12 wherein the step of scanning the outline further comprises the step of looking for the outlining pixel color.

14. The method as in claim 13 wherein the step of looking for the outlining color value further comprises the step of comparing each pixel of the two-dimensional transition image memory with a reference outlining pixel color and upon determining a match detecting the outline.

15. The method as in claim 14 further comprising the step of a determining a coordinate of the detected outline.

16. The method as in claim 15 further comprising the step of storing the coordinate of the detected outline.

17. The method as in claim 15 wherein the step of generating the transition image further comprises the step of using the stored coordinate as a transition point from the first video image to the second.

18. The method as in claim 15 wherein the step of generating the transition image further comprises the step of using the stored coordinate as a transition point from the second video image to the first.

19. The method as in claim 15 wherein the step of outlining the shape of the transition image further comprises marking a closest pixel with the outlining pixel color.

20. The method as in claim 19 wherein the step of marking the closest pixel further comprises the step of identifying the closest pixel.

21. The method as in claim 20 wherein the step of identifying the closes pixel further comprises the step of determining an error between a current line position and a previously selected pixel location.

22. The method as in claim 21 further comprising the step of comparing the determined error with a threshold value.

23. The method as in claim 22 wherein the step of comparing the determined error with a threshold value further comprises the step of selecting a new pixel location adjacent the previously selected pixel location along a first dimension where the determined error exceeds the threshold and along a second dimension when the error does not exceed the threshold.

24. An apparatus for rendering at least a portion of a rendered image from an image provided by an at least one external source into memory locations of a destination memory having integer x and y pixel coordinates based upon a set of integer coordinates of an outline of the portion of the rendered image, such apparatus comprising:
   means for superimposing a parallelogram over at least some of the memory locations of the destination memory, the parallelogram defined by a parallel series of effect lines forming an angle θ with either an x or y axis of the x and y pixel coordinates of the destination memory and bounded on opposing ends of the effect lines by a scan axis, the parallelogram surrounding the outline of the portion of the rendered image within at least part of the destination memory; and
   means for rendering the image from the at least one external source into the outline of the portion of the rendered image within the parallelogram of the destination memory by scanning one effect line at a time along the angle θ with the x or y axis and depositing source information during each scan of an effect line into corresponding memory locations along the effect line and using the outline coordinates as transition points for selection and non-selection of the at least one external source.

25. The apparatus as in claim 24 further comprising means for selecting an at least one pixel pair defining opposing ends of an at least first effect line of the parallel series of effect lines.

26. The apparatus as in claim 25 further comprising means for identifying a locus of pixels joining the at least first pixel pair and defining the at least first effect line.

27. The apparatus as in claim 24 further comprising means for retrieving the coordinates of the outline from a look-up table.

28. The apparatus as in claim 24 further comprising means for detecting transition points by comparing each pixel location of a scan with the coordinates of the outline.

29. The apparatus as in claim 24 further comprising means for generating the coordinates of the outline based upon a set of quadratic equations.

30. The apparatus as in claim 29 wherein the quadratic equations further comprise a pair of hyperbolic equations.

31. The apparatus as in claim 24 wherein the means for rendering the image from the at least one external source into the destination memory while moving unidirectionally along the effect lines and scan axis using the outline coordinates as transition points for selection and non-selection of the image further comprises means for using incremental line drawing to create a locus of point defining each scan axis.

32. The apparatus as in claim 24 wherein the means for endering the image from the at least one external source into the destination memory while moving unidirectionally along the effect lines and scan axis using the outline coordinates as transition points for selection and non-selection of the image further comprises means for using incremental line drawing to create a locus of point defining each effect line.

33. The apparatus as in claim 24 further comprising means for outlining the transition image on a two-dimensional transition image memory.

34. The apparatus as in claim 33 further comprising means for painting the two-dimensional image memory with a background color.

35. The apparatus as in claim 34 further comprising means for outlining the transition image on the two-dimensional transition image memory using an outlining pixel color against the background color.

36. The apparatus as in claim 35 wherein the means for scanning the outline further comprises the step of looking for the outlining pixel color.

37. The apparatus as in claim 36 wherein the means for looking for the outlining color value further comprises means for comparing each pixel of the two-dimensional transition image memory with a reference outlining pixel color and upon determining a match detecting the outline.

38. The apparatus as in claim 37 further comprising means for determining a coordinate of the detected outline.

39. The apparatus as in claim 38 further comprising means for storing the coordinate of the detected outline.

40. The apparatus as in claim 38 wherein the means for generating the transition image further comprises means for using the stored coordinate as a transition point from the first video image to the second.

41. The apparatus as in claim 38 wherein the means for outlining the shape of the transition image further comprises means for marking a closest pixel with the outlining pixel color.

42. The apparatus as in claim 41 wherein the means for marking the closest pixel further comprises means for identifying the closest pixel.

43. The apparatus as in claim 42 wherein the means for identifying the closes pixel further comprises means for determining an error between a current line position and a previously selected pixel location.

44. The apparatus as in claim 43 further comprising means for comparing the determined error with a threshold value.

45. The apparatus as in claim 44 wherein the means for comparing the determined error with a threshold value further comprises means for selecting a new pixel location adjacent the previously selected pixel location along a first dimension where the determined error exceeds the threshold and along a second dimension when the error does not exceed the threshold.

46. A method of rendering a page-turning effect for a video transition image from a first video image to a second video image, such method comprising the steps of: selecting a page turning angle for the page-turning effect from an originating corner of the video transition image; determining a locus of coordinates within the video transition image for a first and second hyperbola having parallel hyperbola axis on opposing sides and parallel to a first line radiating at the page turning angle from the originating corner of the video transition image and having respective hyperbola at the hyperbola axis intersection point tangent to a second line normal to the first line radiating from the originating corner; marking the video transition image along the locus of points of the hyperbola and the second line; scanning the video transition image parallel to the second line and storing the coordinates of the first and second hyperbola and second line; and rendering the video transition image based upon the stored coordinates and first and second video images.

* * * * *